United States Patent [19]

Kitamura

[11] Patent Number: 4,633,432

[45] Date of Patent: Dec. 30, 1986

[54] SYSTEM FOR TRANSFERRING DOCUMENT DATA TO NON-VOLATILE MEMORY IN A WORD PROCESSING APPARATUS

[75] Inventor: Kozo Kitamura, Nara, Japan

[73] Assignee: Sharp Kabushiki Kaisha, Osaka, Japan

[21] Appl. No.: 767,066

[22] Filed: Aug. 19, 1985

Related U.S. Application Data

[63] Continuation of Ser. No. 415,380, Sep. 7, 1982, abandoned.

[30] Foreign Application Priority Data

Sep. 11, 1981 [JP] Japan .................. 56-144380

[51] Int. Cl.[4] .................................. G06F 13/00
[52] U.S. Cl. .................................... 364/900
[58] Field of Search ... 364/200 MS File, 900 MS File

[56] References Cited

U.S. PATENT DOCUMENTS

| | | | |
|---|---|---|---|
| 3,623,012 | 11/1971 | Lowry et al. | 364/200 |
| 3,735,360 | 5/1973 | Anderson | 364/200 |
| 3,760,171 | 9/1973 | Wang et al. | 364/200 |
| 3,898,626 | 8/1975 | Hutson et al. | 364/200 |
| 3,996,569 | 12/1976 | Saunders | 364/200 |
| 4,027,289 | 5/1977 | Toman | 364/900 |
| 4,032,899 | 6/1977 | Jenny et al. | 364/200 |
| 4,062,059 | 12/1977 | Suzuki et al. | 364/200 |
| 4,074,352 | 2/1978 | Cook et al. | 364/200 |
| 4,145,739 | 3/1979 | Dunning et al. | 364/200 |
| 4,204,251 | 5/1980 | Brudevold | 364/200 |
| 4,263,658 | 4/1981 | Fujita | 364/900 |
| 4,306,299 | 12/1981 | Check et al. | 364/900 |
| 4,378,588 | 3/1983 | Katzman et al. | 364/200 |
| 4,446,528 | 5/1984 | Marmom | 364/709 |
| 4,471,486 | 9/1984 | Sibley | 364/900 |

Primary Examiner—David Y. Eng
Attorney, Agent, or Firm—Birch, Steward, Kolasch & Birch

[57] ABSTRACT

A word processing apparatus includes a random access memory for temporarily storing the document data, and a floppy disc for permanently memorizing the document data. A character number counter is included in the word processing apparatus, which develops a control signal when, for example, 100 stroke key input operation is conducted through a keyboard panel. In response to the control signal, the document data temporarily stored in the random access memory is transferred to the floppy disc for updating the document data memorized in the floppy disc.

3 Claims, 7 Drawing Figures

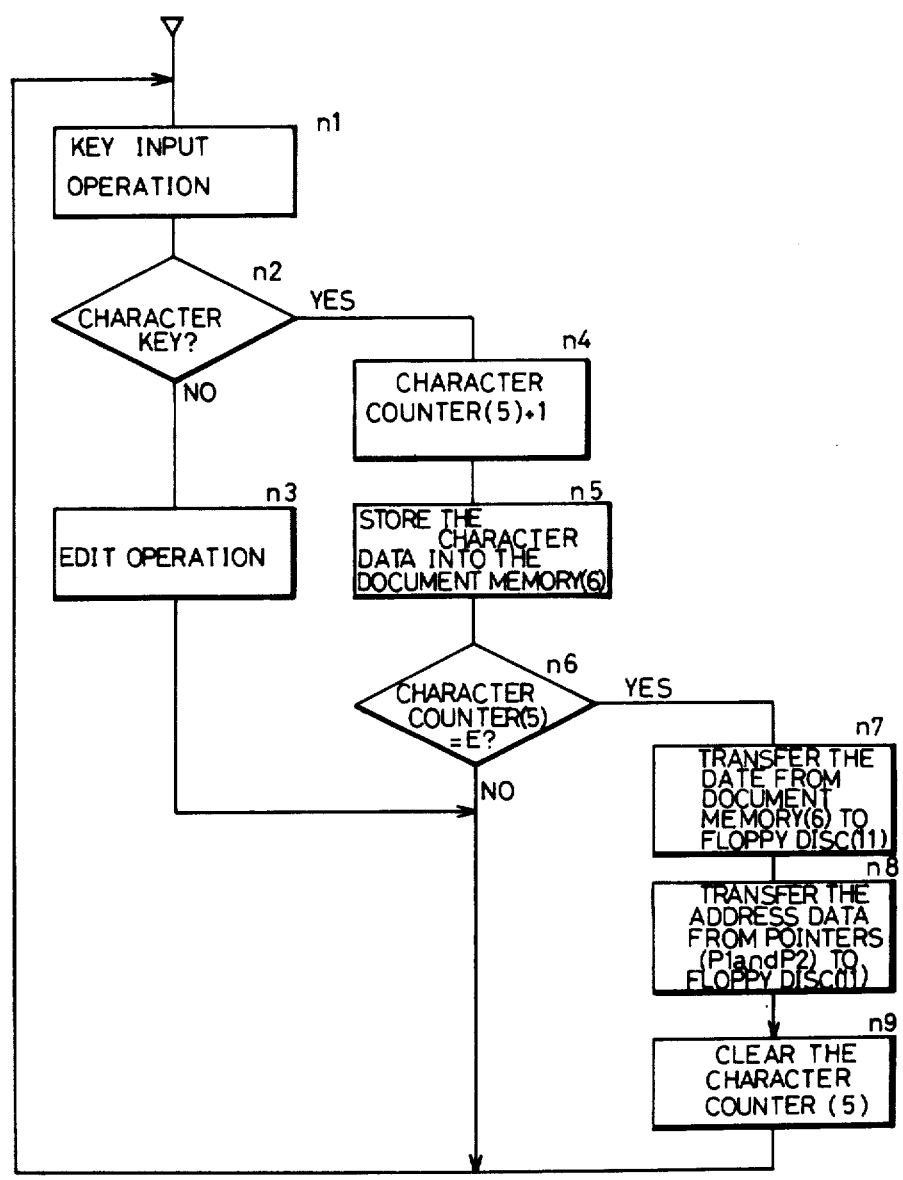
FIG.2 (DOCUMENT DATA STORAGE MAIN FLOW)

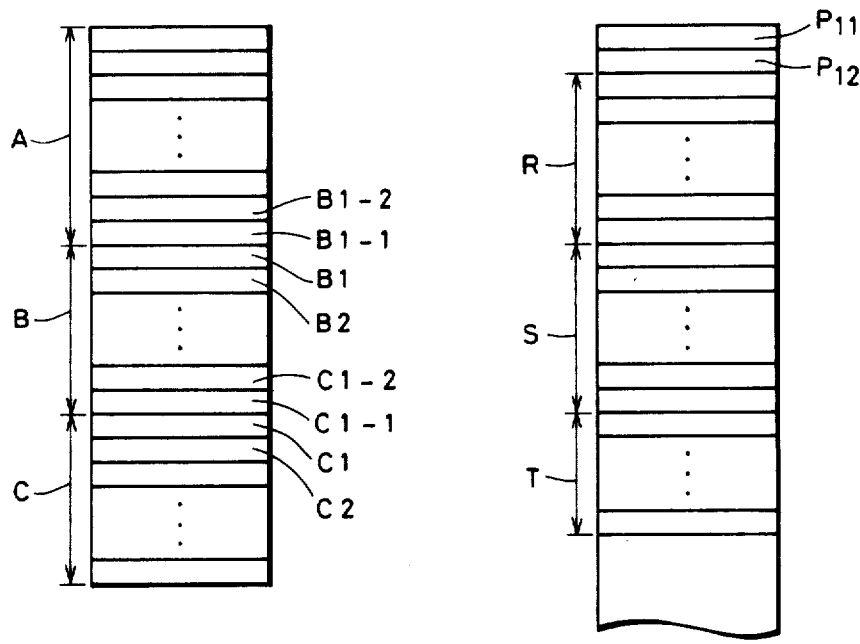
FIG.3 (DOCUMENT MEMORY -6-)
FIG.4 (FLOPPY DISC -11)

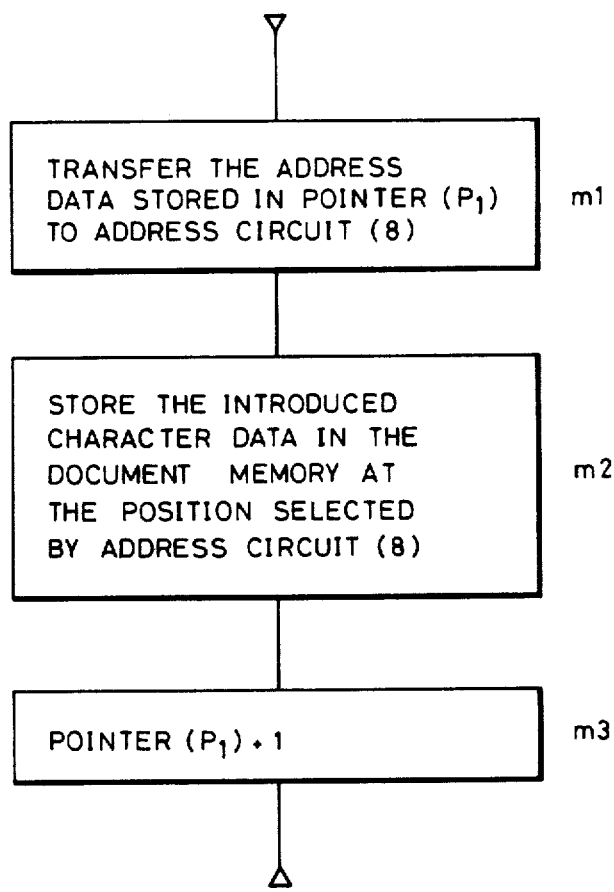
FIG. 5 (DATA INSERTION)

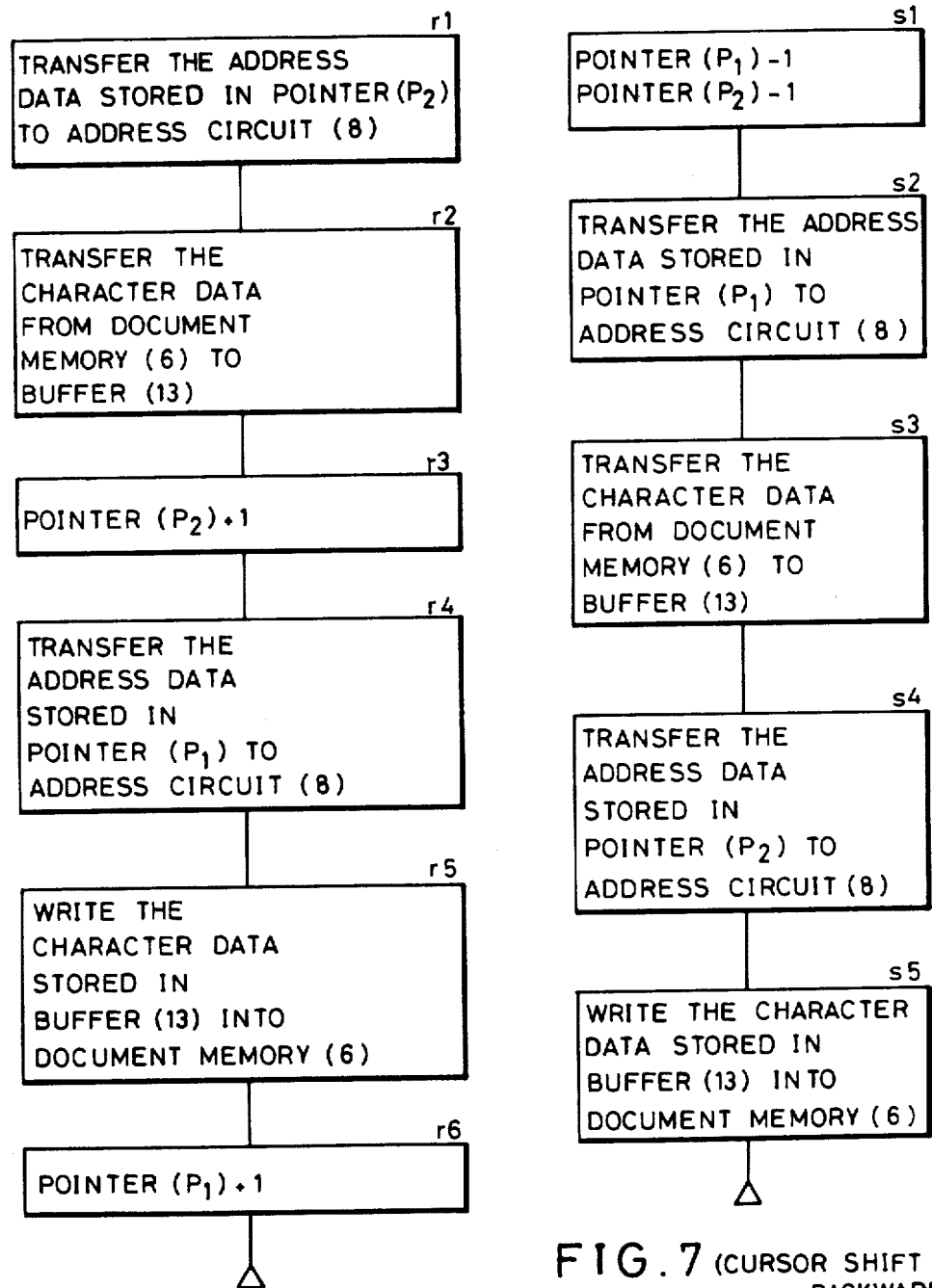
FIG. 6 (CURSOR SHIFT FORWARD)
FIG. 7 (CURSOR SHIFT BACKWARD)

SYSTEM FOR TRANSFERRING DOCUMENT DATA TO NON-VOLATILE MEMORY IN A WORD PROCESSING APPARATUS

This application is a continuation of application Ser. No. 415,380 filed on Sept. 7, 1982 and now abandoned.

BACKGROUND AND SUMMARY OF THE INVENTION

The present invention relates to a document data storage system in a word processing apparatus and, more particularly, to a data protecting system at the interruption of electric service in a word processing apparatus.

Generally, in a word processing apparatus, the document data introduced from a key input panel is temporarily stored in a volatile memory such as a random access memory. The thus stored document data is transferred to an outer non-volataile memory such as a floppy disc when the memory instruction is applied from the key input panel. Accordingly, if the interruption of electric service occurs before conducting the memorizing operation into the floppy disc, the document data temporarily stored in the volatile memory disappears.

Accordingly, an object of the present invention is to provide a novel data storage system in a word processing apparatus.

Another object of the present invention is to provide a data memorizing system which minimizes accidental data erasure at the interruption of electric service in a word processing apparatus.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, pursuant to an embodiment of the present invention, a random access memory is included in a word processing apparatus for temporarily storing document data introduced from a keyboard panel. A floppy disc is associated with the word processing apparatus for permanently memorizing the document data which has been temporarily stored in the random access memory. A character counter is included in the word processing apparatus, which counts the input operation of characters, namely the stroke number. When the count contents of the character counter reach a predetermined value, the document data temporarily stored in the random access memory is transferred to the floppy disc.

Therefore, even when interruption of electric service occurs during the document input operation conducted through the keyboard panel, almost the entire data which has been introduced through the keyboard panel are not erased because most of the document data has been memorized in the floppy disc. When the electric service recovers, the document data memorized in the floppy disc is read out to the random access memory to continue the data input operation.

BRIEF DESCRIPTION OF THE DRAWINGS

The present invention will be better understood from the detailed description given hereinbelow and the accompanying drawings which are given by way of illustration only, and thus are not limitative of the present invention and wherein:

FIG. 2 is a flow chart for explaining a main operation of the word processing apparatus of FIG. 1;

FIG. 3 is a schematic plan view for explaining a memory address of a document memory included in the word processing apparatus of FIG. 1;

FIG. 4 is a schematic plan view for explaining a memory address of a floppy disc included in the word processing apparatus of FIG. 1;

FIG. 5 is a flow chart for exlaining a data insertion operation conducted by the word processing apparatus of FIG. 1;

FIG. 6 is a flow chart for explaining an operational mode for shifting a cursor forward in the word processing apparatus of FIG. 1; and FIG. 7 is a flow chart for explaining an operational mode for shifting a cursor backward in the word processing apparatus of FIG. 1.

DESCRIPTION OF THE PREFERRED EMBODIMENTS

Figure 1:
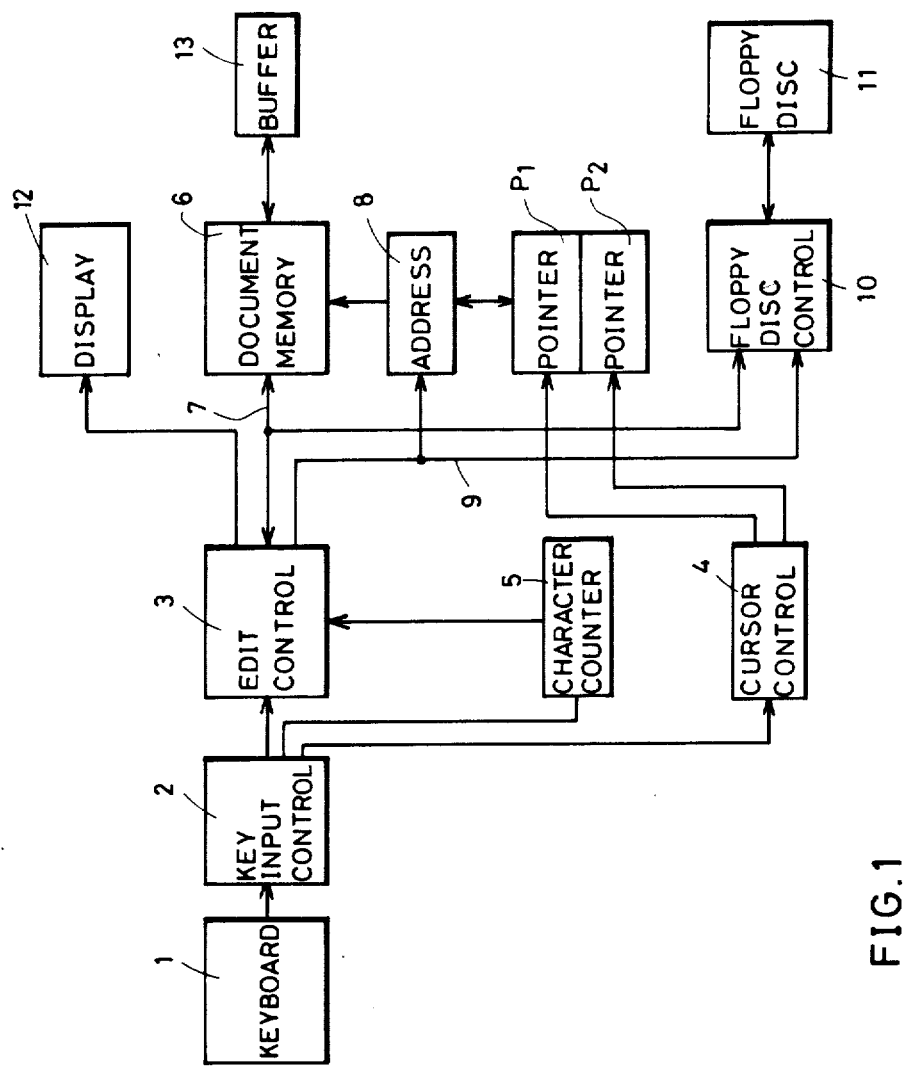
FIG. 1 is a block diagram of an embodiment of a word processing apparatus of the present invention.

A keyboard panel 1 includes character keys for introducing character information and function keys such as a cursor shift key and a recall key. A character signal introduced from the character keys and a function signal introduced from the function keys are applied to a key input control circuit 2 which functions to develop a coded signal in response to the key actuation. A coded character signal and a coded function signal corresponding to the function keys other than the cursor shift key are applied to an edit control circuit 3. A coded signal corresponding to the cursor shift key is applied from the key input control circuit 2 to a cursor control circuit 4. The output signal of the key input control circuit 2 is further applied to a character number counter 5 of which contents are increased by one when one coded character signal is developed from the key input control circuit 2.

The edit control circuit 3 functions to write the character signal into a document memory 6 through a line 7, and to read the character data from the document memory 6 via the line 7. The document memory 6 is a volatile memory such as a random access memory for temporarily storing the document data. The memory area of the document memory 6 is selected in accordance with the address signal developed from an address circuit 8 which is controlled by the edit control circuit 3 via a line 9. The lines 7 and 9 are further connected to a floppy disc control circuit 10. The floppy disc control circuit 10 functions to control a read operation and a write operation conducted to a floppy disc 11 which is a nonvolatile memory. The edit control circuit 3 functions to display the document information stored in the document memory 6 on an image screen 12 such as a cathode ray tube in accordance with the document format instructed through the function keys. Signals developed from the cursor control circuit 4 are applied to pointers $P_1$ and $P_2$ which store the address data for reading or writing from or into the document memory 6. The address data developed from the pointers $P_1$ and $P_2$ are applied to the address circuit 8.

FIG. 2 shows a data input flow in the word processing apparatus of FIG. 1. When any one of the character keys and function keys included in the keyboard panel 1 is actuated at a step n1, a determination is conducted at a step n2 as to whether the character key is actuated. When any one of the function keys is actuated, the operation is advanced to a step n3 where the edit control circuit 3 and the cursor control circuit 4 are activated. When any one of the character keys is actuated, the operation is advanced to a step n4 where the count contents stored in the character number counter 5 are increased by one. At the following step n5, the edit control circuit 3 functions to store the character data into the document memory 6. Thereafter, a determination is conducted at a step n6 as to whether the count contents stored in the character number counter 5 reach a preselected value E, for example, "100". When the count contents stored in the character number counter 5 have not yet reached the preselected value E, the operation is returned to the step n1. When the count contents stored in the character number counter 5 have reached the preselected value E, the operation is advanced to a step n7 where the edit control circuit 3 is activated in order to transfer the data stored in the document memory 6 to the floppy disc 11 via the floppy disc control circuit 10. The address data stored in the pointers $P_1$ and $P_2$ are transferred to the floppy disc 11 via the address circuit 8 and the floppy disc control circuit 10 at a step n8. Then, the count contents stored in the character number counter 5 are cleared at a step n9. That is, the data memorized in the floppy disc 11 is updated whenever the character keys have been actuated 100 times. The document memory 6 and the floppy disc 11 have the memory capacities considerably greater than is required for storing the data of 100 characters. For example, the document memory 6 and the floppy disc 11 have the memory capacities for storing the document data of several tens of pages.

The memory area of the document memory 6 is divided in a manner shown in FIG. 3. FIG. 3 shows a condition where the cursor is moved backward to amend the data previously introduced through the keyboard panel 1. A cursor mark displayed on the image screen 12 is shifted through the use of the cursor shift key included in the keyboard panel 1. The pointer $P_1$ stores the address data of the memory area to which the next character data should be introduced. Therefore, in the normal data input operation, the address data stored in the pointer $P_1$ is increased one by one upon introduction of the character data from the keyboard panel 1. The pointer $P_2$ is useful in the data correction mode wherein the cursor is moved backward to correct the character previously introduced through the keyboard panel 1 or to amend the document previously introduced through the keyboard panel 1. In such a correction mode, the pointer $P_2$ stores the address data of the character data which has been introduced into the next position of the cursor mark. The case of a normal data input operation, wherein no character data has been introduced at a position in front of the cursor mark, the address data stored in the pointer $P_2$ is (the maximum address of the document memory 6)+1.

FIG. 3 shows a condition where the correction operation is conducted. The document memory 6 includes a first region A, a second region B and a third region C. The first region A stores the document data which has been introduced from the keyboard panel 1. The document data stored in the region A corresponds to the document data positioned before the cursor mark on the image screen 12. The second region B stores the document data of which the first address corresponds to the address data stored in the pointer $P_1$ and the last address corresponds to the address which is next before the address data stored in the pointer $P_2$. The third region C stores the document data of which first address corresponds to the address data stored in the pointer $P_2$. That is, the region C stores the document data which has been introduced and is located in front of the cursor mark now displayed on the image screen 12. The image screen 12 is controlled to display the document data stored in the regions A and C of the document memory 6. The document data stored in the region B is not displayed on the image screen 12. As already discussed above, in the initial state, where no data has been introduced into the document memory 6, the pointer $P_1$ stores the address data of the first address of the document memory 6, and the pointer $P_2$ stores the address data which is (the maximum address of the document memory 6)+1. When the document data is introduced into the document memory 6 to its full capacity, the address data stored in the pointer $P_1$ corresponds to (the maximum address of the document memory 6), and the address data stored in the pointer $P_2$ corresponds to (the maximum address of the document memory 6)+1.

The document data stored in the document memory 6 and the address data stored in the pointers $P_1$ and $P_2$ are transferred to the floppy disc 11 for updating purposes at the steps n7 and n8 in FIG. 2. FIG. 4 shows a memory area of the floppy disc 11. The document data temporarily stored in the document memory 6 is read out from the first address and is applied to the floppy disc 11 through the use of the floppy disc control circuit 10. The document data stored in the regions A, B and C of the document memory 6 are transferred to regions R, S and T, respectively. The address data stored in the pointers $P_1$ and $P_2$ are transferred to regions $P_{11}$ and $P_{12}$, respectively.

FIG. 5 shows an operational mode, wherein a character data is inserted before the cursor mark in the correction mode. The address data stored in the pointer $P_1$ is transferred to the address circuit 8 at a step m1. Thus, the character data is introduced into and stored in the memory region B1 of the document memory 6, which is selected by the address circuit 8, at a step m2. Then, the contents stored in the pointer $P_1$ are increased by one at a step m3. Accordingly, the address data stored in the pointer $P_1$ corresponds to the memory region B2. Therefore, the memory region B1 is included in the memory region A, thereby the character introduced into the memory region B1 is displayed on the image screen 12. The region B which is not displayed on the image screen 12 comprises the memory regions B2 through C1-1.

When the character stored in the memory region C1 is desired to be erased, the function key is operated to increase the address data stored in the pointer $P_2$. By this operation, the first address of the memory region C is shifted down by one in FIG. 3. Thus, the memory region C1 is included in the memory region B, whereby the character stored in the memory region C1 disappears from the image screen 12.

FIG. 6 shows an operational mode wherein the cursor mark is shifted forward by one character position in the correction mode. More specifically, the character data stored in the memory region C1 is first transferred to the memory region B1 and, then, an operation is conducted so that the memory, region A includes the memory region B1. The address data stored in the pointer $P_2$ is supplied to the address circuit 8 at a step r1. Thus, the character data stored in the memory region C1 is read out at a step r2, and the character data is transferred to and temporarily stored in a buffer 13. At the following step r3, the contents stored in the pointer $P_2$ are increased by one. Thus, the first address of the memory region C corresponds to the memory region C2. At the following step r4, the address data stored in the pointer $P_1$ is applied to the address circuit 8. The document data temporarily stored in the buffer 13, which has been memorized in the memory area C1, is written into the memory region B1, which is selected in accordance with the address data stored in the pointer $P_1$, at a step r5. The contents stored in the pointer $P_1$ are increased by one at a step r6. In this way, the memory region A includes the memory region B1. Thus, the memory region B comprises the memory regions B2 through C1.

FIG. 7 shows an operational mode, wherein the cursor mark is shifted backward by one character position in the correction mode. More specifically, the document data stored in the last region B1-1 of the memory region A is transferred to and stored in the memory region C1-1, and an operation is conducted so that the memory region C includes the memory region C1-1, whereby the memory region B is shifted upward in FIG. 3 by one character memory position. First, the address data stored in the pointers $P_1$ and $P_2$ are decreased by one at a step s1. The thus modified address data stored in the pointer $P_1$ is applied to the address circuit 8 at a step s2. The character data stored in the memory region B1-1 is read out and stored in the buffer 13 at a step s3. At the following step s4, the address data stored in the pointer $P_2$ is applied to the address circuit 8. At the following step s5, the character data stored in the buffer 13, which has been stored in the memory region B1-1, is tranferred to and stored in the memory region C1-1 which is selected by the address data stored in the pointer $P_2$. Since the address data stored in the pointers $P_1$ and $P_2$ are decreased by one at the step s1, the memory region B includes the memory regions B1-1 through C1-1. That is, the memory region B is shifted upward in FIG. 3 by one position.

In the prior art system, the memory region B was not included in the document memory. The character data was introduced into the document memory 6 in the order corresponding to the display format. Accordingly, in order to conduct the correction operation, the character data which is positioned in front of the cursor mark should be introduced into a buffer memory system. The document data stored in the buffer memory system was returned to the document memory after the correction operation is completed. Thus, the operation of the prior art was complicated. The present invention simplifies the correction operation due to the provision of the memory region B in the document memory 6. Furthermore, the document data stored in the memory regions A, B and C of the document memory 6 is transferred to the memory regions R, S and T of the floppy disc 11 and, therefore, the data transfer is easily conducted between the document memory 6 and the floppy disc 11.

The document data memorized in the floppy disc 11 is updated every time 100 strokes are introduced from the keyboard panel 1. Accordingly, even when the interruption of electric service occurs during the data input operation, the document data memorized in the floppy disc 11 is recalled upon recovery of the electric service. The operator is required to reintroduce less than 100 strokes of document data.

The invention being thus described, it will be obvious that the same may be varied in many ways. Such variations are not to be regarded as a departure from the spirit and scope of the invention, and all such modifications are intended to be included within the scope of the following claims.

What is claimed is:

1. A document data storage system in a word processing apparatus comprising:

input means for introducing document data into said word processing apparatus by actuation of character keys;

temporary memory means, responsive to said input means, for temporarily storing said document data entered into the word processing apparatus;

permanent nonvolatile memory means for permanently memorizing said document data;

transfer means for transferring said document data temporarily stored in said temporary memory means to said permanent nonvolatile memory means;

character counter means, responsive to each actuation of a said character key, for developing a count indicative of the number of character keys actuated while introducing said document data into said word processing apparatus; and control means, responsive to the count developed by said character counter means, for activating said transfer means when said count reaches a predetermined number to transfer a batch of the data produced by the predetermined number of character key actuations to said permanent nonvolatile memory means, thereby updating said document data memorized in said permanent nonvolatile memory means said control means resetting said character counter means each time said transfer means is enabled to transfer a said batch of said data, each said batch containing less data than the data storage capacity of said temporary memory means, whereby the batches of the document data stored in said temporary memory means are periodically transferred to said permanent nonvolatile memory means to update the data stored therein and preclude loss of batches so transferred in the event of a power failure.

2. The document data storage system of claim 1, wherein said temporary memory means comprises a random access memory, and said permanent nonvolatile memory means comprises a floppy disc.

3. The document data storage system of claim 2, wherein said floppy disc has a memory area corresponding to a memory area of said random access memory, such that document data temporarily stored in a region of random access memory is transferred to a corresponding region of said floppy disc memory.

* * * * *